O. D. Woodruff.
Meat Cutter.
N° 87,611. Patented Mar. 9, 1869.
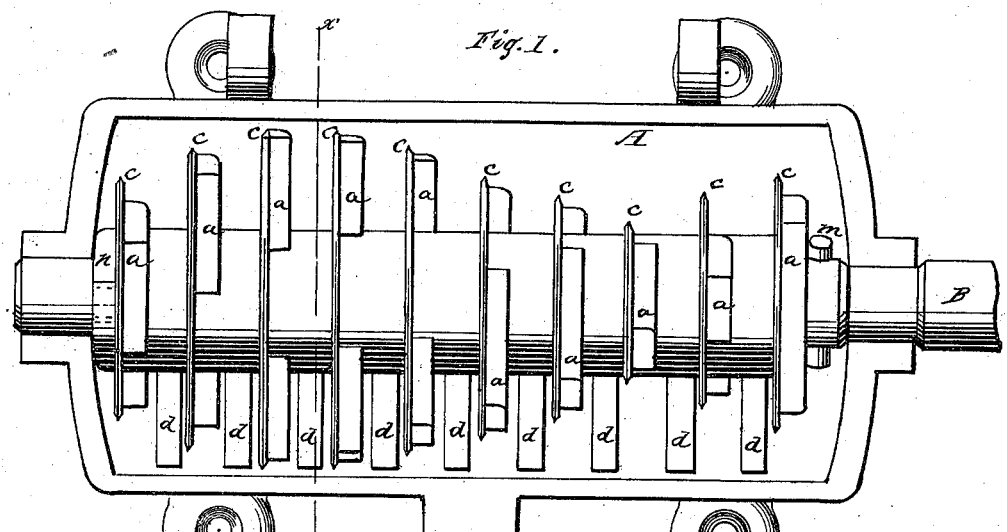
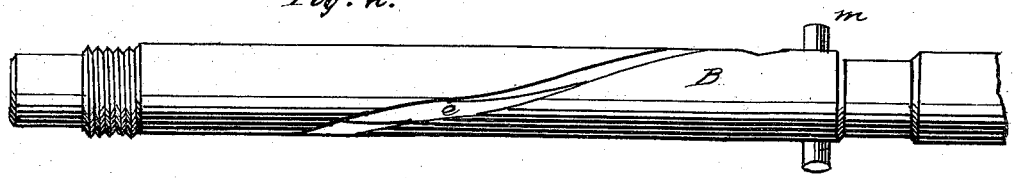
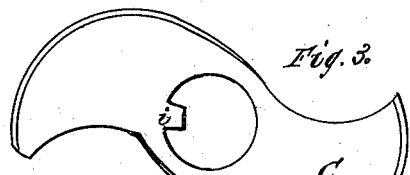 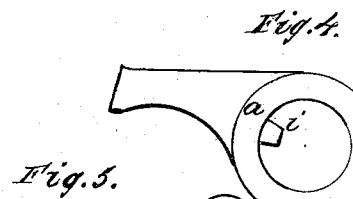
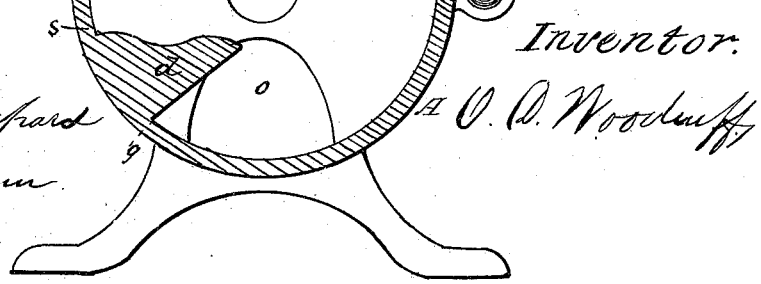
Witnesses:
James Shepard
S. C. Dunham
Inventor.
O. D. Woodruff

O. D. WOODRUFF, OF SOUTHINGTON, CONNECTICUT.

Letters Patent No. 87,611, dated March 9, 1869.

IMPROVED MEAT-CUTTER.

The Schedule referred to in these Letters Patent and making part of the same.

*To all whom it may concern:*

Be it known that I, O. D. WOODRUFF, of Southington, in the county of Hartford, and State of Connecticut, have invented a new and useful Improvement in Meat-Cutters; and I do hereby declare that the following is a full, clear, and exact description thereof, which will enable those skilled in the art to make and use the same, reference being had to the accompanying drawings, making a part of this specification, in which—

Figure 1 is a plan or top view of my invention, with the upper portion of the shell or case removed.

Figure 2 is a side elevation of the shaft.

Figure 3 is a side elevation of one of the knives.

Figure 4 is a side elevation of one of the drivers.

Figure 5 is a transverse section on line $x$–$y$.

Similar letters of reference indicate like parts.

My invention consists in the use or employment of arms, or studs, projecting from a revolving shaft or cylinder, and combined with a set of knives on the same shaft, as hereinafter described.

$a$ designates the arms, or studs, which I term the "drivers."

$c$ designates the knives.

Both the knives $c$ and drivers $a$ are arranged spirally on the same shaft, with the front of each driver $a$ a little back of the cutting-edge of each one of the knives $c$.

The shell, or case, A, is substantially the same as those in common use, and has stationary studs, $d$, cast on one part of the case A.

The stationary studs $d$ should be of such distances apart as to allow one of the drivers $a$ and knives $c$ to pass freely between the same.

Immediately after the meat is cut by each knife $c$, the driver $a$ strikes the meat, and carries it on, clearing the stationary studs $d$ of meat, ready for a fresh supply, thereby greatly hurrying the meat in its passage through the machine.

These drivers $a$ can be combined with knives on any revolving shaft, in any of the ordinary styles of meat-cutters, and will be found very advantageous in crowding the meat in its passage through the machine.

I construct the shaft B round, and with a spiral groove, $e$, as shown in fig. 2.

Near the centre of the knives $c$ and drivers $a$, I make a round aperture with a small spur, $i$, extending toward its centre.

On one end of shaft B, I place a pin, $m$, or a suitable flange, and the other end of said shaft is threaded to receive the nut $n$.

As the knives $c$ and drivers $a$ are placed on the shaft B, the small spur $i$ enters the spiral groove $e$, and causes the knives $c$ and drivers $a$ to maintain a spiral form on the shaft B. The whole are then secured in place by the nut $n$.

What I claim as new, and desire to secure by Letters Patent, is—

The drivers $a$ and knives $c$, when combined and arranged alternately on the same shaft, substantially as shown and described, and for the purposes set forth.

O. D. WOODRUFF.

Witnesses:
   JAMES SHEPARD,
   S. C. DUNHAM.